April 30, 1963 G. A. HOHSTADT 3,087,557
EARTH CUTTER ASSEMBLY
Filed March 11, 1960 3 Sheets-Sheet 1

INVENTOR
GAIL A. HOHSTADT

BY *Ralph T. Barrett*

ATTORNEY

April 30, 1963
G. A. HOHSTADT
3,087,557
EARTH CUTTER ASSEMBLY
Filed March 11, 1960
3 Sheets-Sheet 2
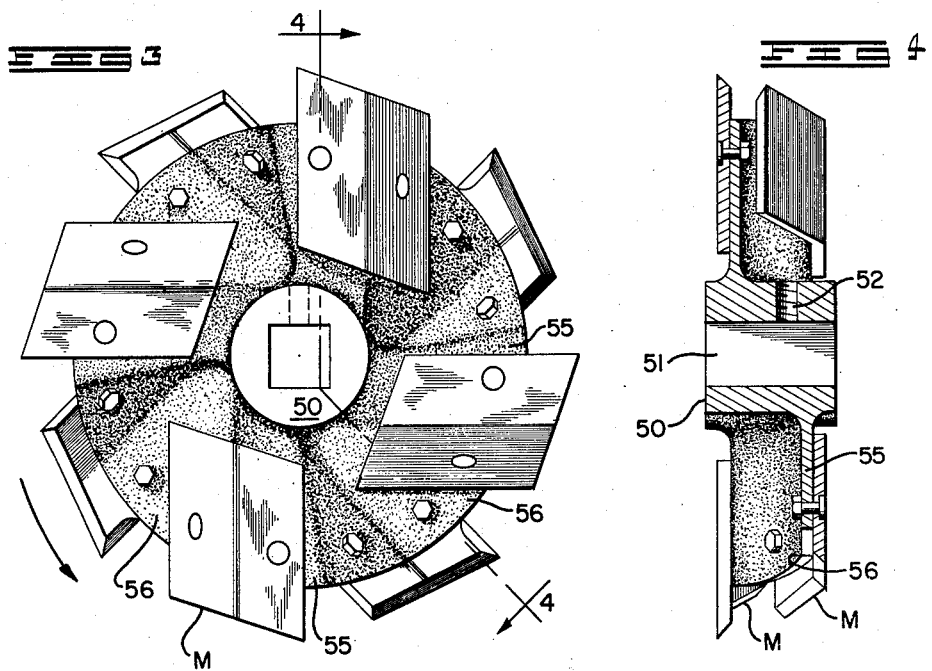
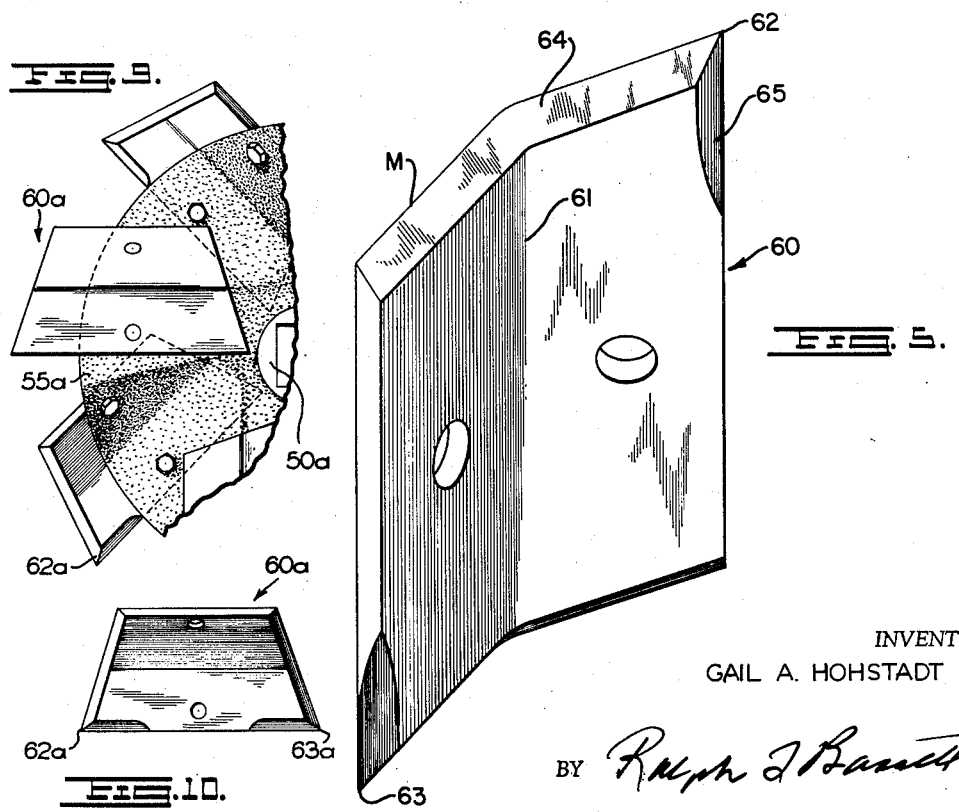
INVENTOR
GAIL A. HOHSTADT
BY *Ralph T. Barrett*
ATTORNEY April 30, 1963   G. A. HOHSTADT   3,087,557
EARTH CUTTER ASSEMBLY
Filed March 11, 1960   3 Sheets-Sheet 3
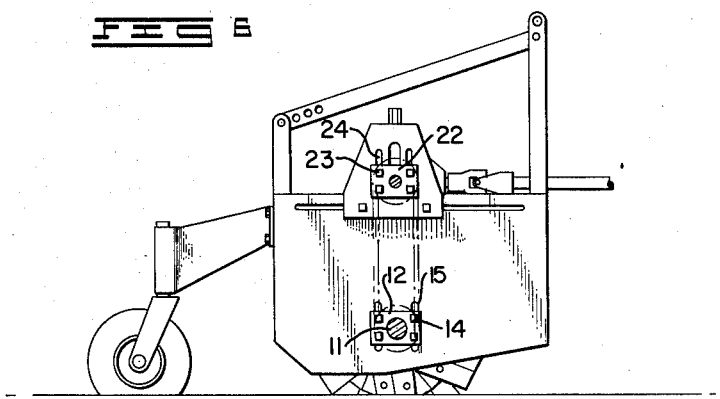
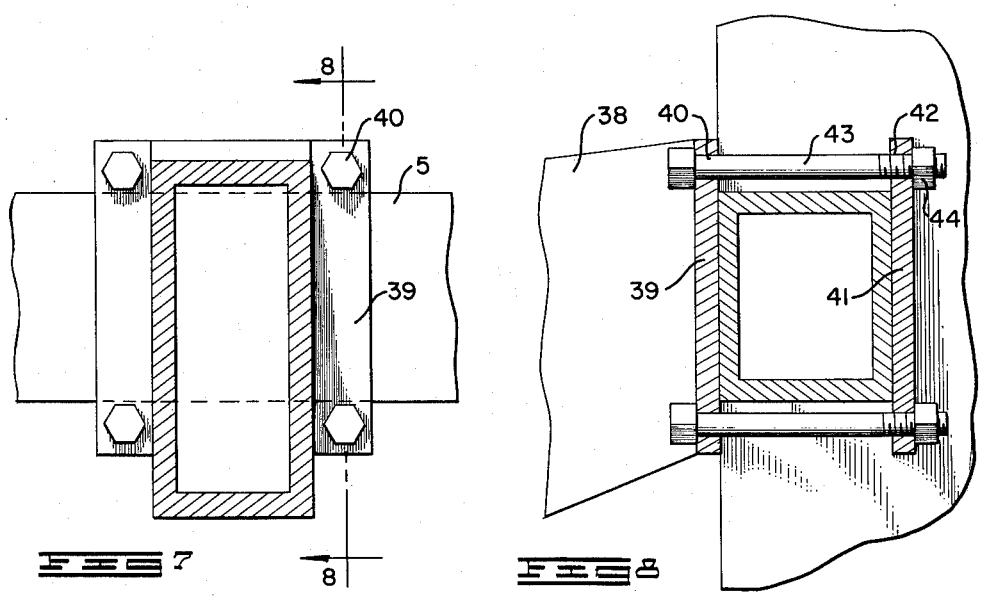
INVENTOR
GAIL A. HOHSTADT
BY *Ralph Z Bassett*
ATTORNEY

United States Patent Office 3,087,557
Patented Apr. 30, 1963

3,087,557
EARTH CUTTER ASSEMBLY
Gail A. Hohstadt, Rte. 1, Box 424, Ontario, Oreg.
Filed Mar. 11, 1960, Ser. No. 14,454
5 Claims. (Cl. 172—556)

This invention covers a new principle of corrugating, using a revolving action in making and forming trenches or furrows across a field to facilitate water flow in irrigation.

The primary object of this invention is to provide a power operated implement in which a plurality of relatively adjustable rotary power driven elements are provided, the elements being so constructed and arranged that upon operation they will define trenches of predetermined dimension and uniform depth.

Another object of the invention is to provide a rotary corrugating implement which includes a plurality of novel blades, the blades being so positioned that they will form a trench or furrow for the flow of water by removing the earth and distributing the earth uniformly between the trenches.

Another object of the invention is the provision of cutting tools which may be removably secured to a disk or wheel structure, the disk or wheel structure having offset portions for seating the cutters and for projecting them at predetermined angles to form the furrow or trench and to distribute the removed earth laterally and uniformly.

A further object of the invention is to provide a rotary cutter embodying a hub and a wheel portion for mounting cutters, the wheel portion having oppositely disposed angular crowns projecting generally tangentially from the hub and adapted to seat cutter blades shaped generally as rhomboids with their end cutting faces diagonally arranged to provide diametrically positioned projecting cutter faces to permit reversing of the cutters.

Another object of the invention is the provision of cutter blades having rhomboid configuration, which blades are transversely of V-form with the crown of the structure forming a guiding and seating face for association with a mounting structure.

Figure 1:
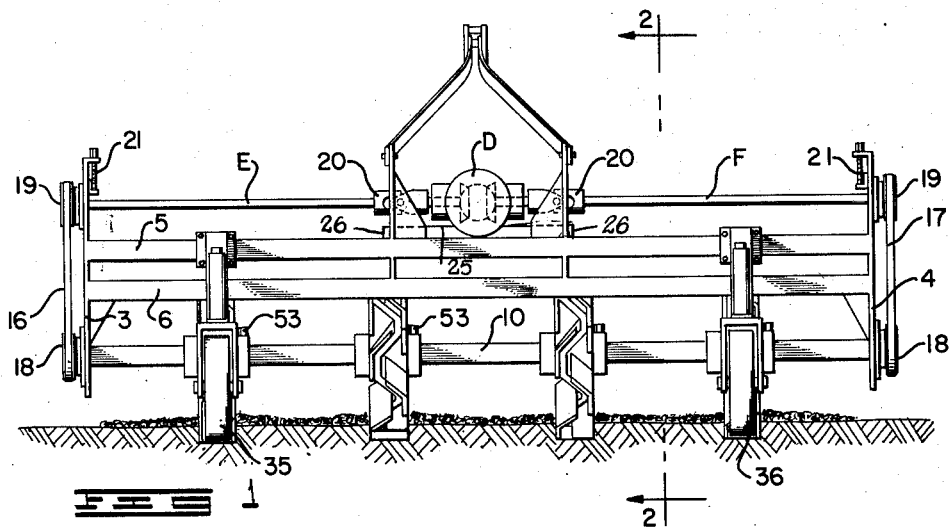
Figure 2:
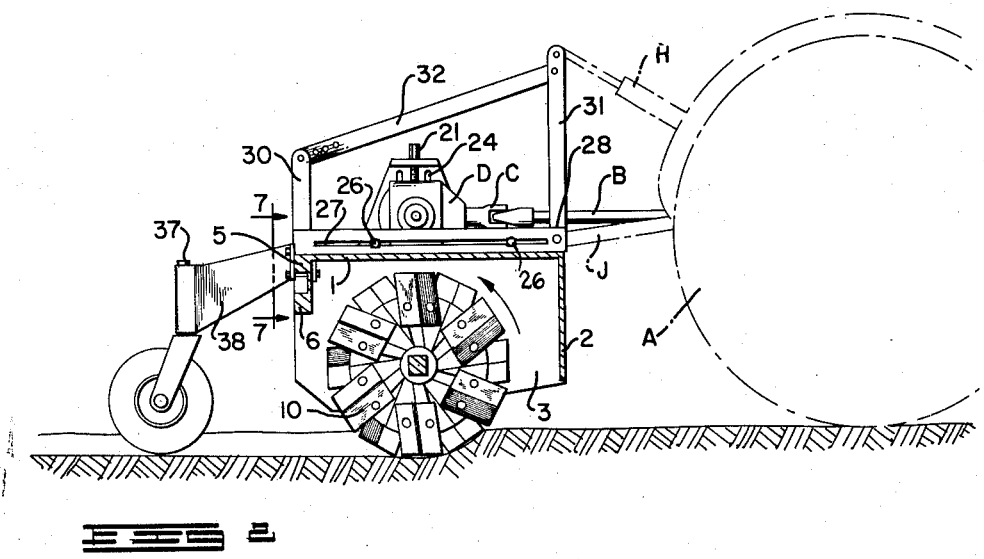

These and other objects of the invention will more clearly hereinafter appear by reference to the accompanying drawings forming a part of the instant specification wherein like characters of reference designate corresponding parts throughout the several views, in which:

FIG. 1 is a rear elevation;
FIG. 2 is a vertical section on line 2—2 of FIG. 1;
FIG. 3 is a side elevation of a rotary corrugator tool;
FIG. 4 is a section on line 4—4 of FIG. 3;
FIG. 5 is a perspective view of one of the cutter elements;
FIG. 6 is an end elevation of the corrugator assembly;
FIG. 7 is a section on line 7—7 of FIG. 2;
FIG. 8 is a transverse section on line 8—8 of FIG. 7;
FIG. 9 is a fragmentary elevation of a portion of a modified form of rotary corrugator cutter; and
FIG. 10 is an elevation of one of the modified cutters.

Heretofore in corrugating ground by forming trenches or furrows for the purpose of flowing water across the field for irrigation purposes, it has been the practice to use rigid shovels which have a general plowing effect in that the trenches formed by the rigid shovels leave the ground very rough after corrugation by leaving large chunks of earth or other sod formations at the side of the furrow or trench which are deposited on the ground between the furrows or corrugations and smother or otherwise injure the crop. Also with the shovel type corrugating device, the chunks of earth or soil in some instances have a tendency to fall back into the trench formed by the shovel, which necessarily interferes or stops the flow of water in these trenches. As a result, where a rigid shovel type corrugator is used to form trenches for irrigating purposes, it has been necessary to use hand labor to clean the trenches after their initial formation in order to obtain normal and proper water flow.

In the instant invention the rotary corrugator cutter wheel assemblies are so constructed and arranged that the walls of the corrugations or furrows are cleanly cut and trimmed and the earth removed by this operation is pulverized and dispersed laterally and evenly between the furrows or corrugations. As a result, there is no need for manual labor in completing and perfecting flow trenches which will operate successfully in delivering irrigating fluid.

In FIG. 2 a wheel is indicated at A, this tractor wheel driving the power shafts E and F through shaft B, universal joint C and differential D. The rotary corrugator assembly which is driven by the tractor is normally supported by an adjustable linkage bar or hydraulic jack H which is connected to a portion of the corrugator assembly and through bottom link J will adjustably hold the same generally suspended to permit regulation of the depth of the cut of the rotary corrugator.

The corrugator includes a housing defined by top wall 1, front wall 2, end walls 3 and 4 and relatively heavy rear cross braces 5 and 6 which form a shortened rear wall portion. The corrugator cutter wheels are shown as four in number and are mounted on a square driven shaft 10, as shown in FIG. 2, the shaft 10 having cylindrical end spindle portions 11, see FIG. 6, mounted in adjustable bearing blocks 12 by bolts 14 associated with slots 15 in each end wall 3 and 4. The shaft 10 is driven at each end by V-belts 16 and 17 mounted on the driven pulleys 18 on shaft 10 and the driving pulleys 19, the latter being supported at the ends of the driven shafts E and F through the differential D. Universal joints 20 are provided for each shaft E and F and adjustment of the drive at each end of the assembly is by means of the turn screws 21 which operate the bearing blocks 22, see FIG. 6, to adjust the latter by the use of the bolts 23 associated with the slots 24. In FIG. 2 the differential D is shown as supported in blocks 25 transversely adjustable by use of the fastenings 26 associated with the slots 27 formed in the transverse plate member 28 mounted on the top 1 of the housing.

The jacking of the corrugator assembly is facilitated by the rear upright 30 and front upright 31 fixed to the housing and connected by diagonal link 32. This linkage facilitates the distribution of the forces exerted through the linkage bar or jack H which supports the assembly and is mounted on the tractor at the upper end of the front upright 31 for adjustment to position the structure for cutting of trenches by the cutter wheels at a predetermined depth. In association with the supporting linkage or jack H gauge rollers or wheels 35 and 36 are provided, these gauges rollers being swivel-mounted at 37 at the outer ends of depending brackets 38, which brackets are horizontally adjustable on the rear cross brace 5, as shown in FIGS. 7 and 8. The inner end of the bracket 38 is formed with a vertical plate 39 which is formed with bolt openings 40 and an associated clamp plate 41 is provided with similarly arranged bolt openings 42 through which bolts 43 extend and are secured by nuts 44.

The rotary corrugator wheels (FIGS. 3 and 4) include a relatively long hub 50 having a square bore 51 for the passage of reversely driven shaft 10, the hub having a transverse bolt opening 52 which is threaded to receive a lock bolt 53. By this arrangement the spacing of the corrugator wheels may be arranged in accordance with requirements, and in this connection it will be noted that the gauge rollers 35 are shown positioned so as to run in the furrow or trench behind the two laterally spaced corrugator wheels. Any number of gauge wheels can be provided and positioned as required by the operator. The disc-like web structure of the corrugator wheel includes blade mounting portions, each blade mounting portion including a flat vertical face 55 lying in a plane normal to the axis of the hub and an adjacent flat angular face 56, the angular face lying in a plane intersecting the axis of the hub at approximately 30 degrees. The vertical faces 55 are alternately spaced laterally at each side of a vertical plane which is normal to the axis of the hub and the angular faces 56 connect the faces 55. The faces 55 and 56 are designed for association and support of the blade of novel construction to be hereinafter described. Any number of blade mounts may be formed at each side of the corrugator wheel in accordance with the size of the wheel and other requirements and each of the mounting areas, i.e., the vertical flat face and the adjacent angular flat face, are provided with bolt openings for securing the blades.

The blade per se is illustrated in FIG. 5 and generally comprises a plate of rhomboid configuration as shown at 60, the plate 60 being bent lengthwise and medially to define a pair of converging blades separated by medial portion 61. By having the plate of rhomboid configuration there are provided diametrically arranged cutting points 62 and 63, these cutting points being defined by the diagonal cutting edges 64 at the ends of the blade srtucture and relatively short diagonal cutting edges 65 merging therewith at the points 62 and 63, as heretofore mentioned. By using this type of blade and by the mounting structure provided therefor on the corrugator wheel, it will be noted that each alternate blade includes a generally vertical wall cutting sharpened edge portion 62, 64, 65 and a follower angular surface M which projects inwardly at an angle substantially 30 degrees with respect to the axis of the hub, the latter forming a pulverizing and excavating area. In other words, the actual cutting of the furrow or trench walls is performed by the sharpened projecting cutting edge of the blade and the material cut by this blade is pulverized and dispersed laterally of the corrugator wheel by the following angular portion of the blade indicated at M in FIG. 5.

Inasmuch as the blades alternate at each side of the wheel, it follows that the rotation of the wheel from the source of power A counterclockwise or in the direction of movement of the implement will result in a slicing of the trench walls and a pounding and pulverizing of the sliced wall structure immediately following the cutting and also as a result of the radial forces applied by the angular portions of the blade in ejecting the cut material from the trench. In other words, the cutting edge defined at the projecting corners of the rhomboid blade structure severs the earth or sod linearly, while the angled portion of the blade indicated at M in FIGS. 3 and 4, presents an area for pulverizing and dispersing the cut-out earth structure. The approximate 30 degree angle of the following edge of the cutter functions to both break the soil and to distribute the broken or crumbled soil in between the furrows and at opposite sides of the corrugator wheel, the soil being constantly dispersed laterally and forwardly during rotation of the wheels so that there will be an even level distribution of pulverized earth as distinguished from the rigid shovel where clods of earth are thrown or fall back into the corrugations or furrow. In other words, the pulverized and dispersed or ejected soil from the trench is constantly distributed between the furrows by the angular portions of the several blades at each side of the corrugator wheel so that the earth from the trench does not form a heavy collection of soil which might injure or smother any growing crops between the trenches as is illustrated in FIG. 1.

In operation of this device, as pointed out supra, the ejection of the soil by the angular portions of the blades is such that the soil from the several blades of a wheel will cause the soil being ejected to move transversely of the wheel structure and through the wheel structure so that any large clods of dirt thrown from the trench by the rotating cutter wheel will be intercepted by the blade at the opposite side of the wheel and crushed or pulverized. In other words, during the operation of a single cutter wheel the blade on the right hand side of the wheel will cut and eject the coil through and across the wheel structure so that any clods will be pulverized by the blade at the opposite side of the wheel. The wheels, by the drive means shown, rotate counterclockwise throwing the dirt forwardly or in the direction of the moving vehicle and spreading the earth laterally at each side of the trench.

In addition to the foregoing, the alternate blades are positioned about the square crankshaft 10 so that the implement will be balanced to provide the same amount of cutting at each side of the vehicle. This is accomplished by alternating the position of the rotary cutters on the shaft 10. In the present instance the shaft is shown as square in shape with the hub of the cutter square. The number of cutter blades is shown as eight, i.e., four at each side of the cutter wheel structure. By rotating the position of each alternate cutter blade on the shaft a quarter of a turn, the position of the respective cutters will be such that the cutting and dispersing load will be evenly distributed across the transverse length of the implement, thus eliminating any rough operation and providing a smooth continuous function of the device.

FIGS. 9 and 10 disclose a modified form of rotary corrugator cutter. In FIG. 9 the hub of the cutter wheel is shown at 50a, the web of the wheel 55a being of the same general configuration as in the initial disclosure. In the modified form of wheel, the cutter 60a has its cutter faces 62a and 63a at the terminals of the elongated face of the blade structure and in this form of the invention the two cutting corners can be utilized by reversing the blade to opposite sides of the cutter wheel structure.

What I claim is:

1. In an earth cutter assembly for a corrugator for forming trenches for irrigation, said cutter assembly including a hub and a disc-like web projecting from the hub, said disc-like web including first spaced flat blade mounting portions alternately projecting laterally from a plane through the center of the hub which is normal to the axis of the hub, and flat blade mounting portions connecting the adjacent edges of the spaced flat blade mounting portions and lying at an obtuse angle thereto, and earth working elements attached to said mounting portions, said earth working elements including soil cutters and earth breakers, said earth breakers following said soil cutters and being mounted on said flat blade mounting portions connecting the adjacent edges of the first flat blade mounting portions.

2. In an earth cutter assembly for a corrugator for forming trenches for irrigation, said cutter assembly including a hub and a disc-like web projecting from the hub, said disc-like web including spaced flat faces lying generally parallel to and at alternate sides of a plane through the hub and normal to its axis, and additional connecting flat faces between and merging at an obtuse angle with the flat faces lying at the alternate sides of the plane through the hub and normal to its axis, and earth working elements attached to said faces, said earth working elements each being in the form of a rhomboid which is so shaped as to seat on said alternate flat and angular faces.

3. The structure of claim 2 characterized in that the earth working element is formed at its diametrically projecting extremities with sharpened cutting edge portions.

4. In an earth cutter assembly for a corrugator for forming trenches for irrigation, said cutter assembly including a hub and a disc-like web projecting from the hub, said disc-like web having its lateral faces formed with spaced flat mounting portions which alternately project laterally from a plane through the center of the hub which is normal to the axis of the hub and including connecting portions for the mounting portions lying at an obtuse angle to said mounting portions, the line of juncture between the flat mounting portions and the connecting portions extending in a direction generally tangential to the hub structure, and earth working elements fixed to the mounting portions, said earth working elements being in the form of a rhomboid and including portions for overlying the connecting portions of the web.

5. The structure of claim 4 characterized in that the earth working elements comprise plates which are transversely bent to form expanded V's and having cutter faces at opposite marginal edges for association with opposite faces of the disc-like web.

References Cited in the file of this patent

UNITED STATES PATENTS

| | | |
|---|---|---|
| 440,836 | Billups | Nov. 18, 1890 |
| 578,250 | Holland et al. | Mar. 2, 1897 |
| 617,607 | Scearcy et al. | Jan. 10, 1899 |
| 1,050,987 | Nilson | Jan. 21, 1913 |
| 1,414,364 | Koszegi | May 2, 1922 |
| 1,641,393 | Mackie | Sept. 6, 1927 |
| 2,168,733 | Dufour | Aug. 8, 1939 |
| 2,603,136 | Thomas | July 15, 1952 |
| 2,654,982 | Edwards | Oct. 13, 1953 |
| 2,691,933 | Emerson | Oct. 19, 1954 |
| 2,701,941 | Heth | Feb. 15, 1955 |
| 2,725,813 | Stoeber | Dec. 6, 1955 |
| 2,732,785 | Kleppe | Jan. 13, 1956 |
| 2,750,860 | Zanola | June 19, 1956 |

FOREIGN PATENTS

| | | |
|---|---|---|
| 317,605 | Germany | Oct. 19, 1920 |
| 590,435 | Great Britain | July 17, 1947 |
| 786,990 | Great Britain | Nov. 27, 1957 |